(12) United States Patent
Zimmerman

(10) Patent No.: US 6,978,476 B2
(45) Date of Patent: Dec. 20, 2005

(54) DEVICE AND METHOD OF DETERMINING LOCATION OF SIGNAL INGRESS

(75) Inventor: Dennis A. Zimmerman, Bridgewater, VA (US)

(73) Assignee: Comsonics, Harrisonburg, VA (US)

( * ) Notice: Subject to any disclaimer, the term of this patent is extended or adjusted under 35 U.S.C. 154(b) by 948 days.

(21) Appl. No.: 09/914,907

(22) PCT Filed: May 16, 2001

(86) PCT No.: PCT/US01/15815

§ 371 (c)(1),
(2), (4) Date: Sep. 5, 2001

(87) PCT Pub. No.: WO01/89197

PCT Pub. Date: Nov. 22, 2001

(65) Prior Publication Data

US 2003/0033609 A1   Feb. 13, 2003

Related U.S. Application Data

(60) Provisional application No. 60/204,584, filed on May 16, 2000.

(51) Int. Cl.$^7$ ............................................. H04N 7/173
(52) U.S. Cl. .................. 725/125; 725/107; 348/192; 348/193
(58) Field of Search ................................. 725/107, 121, 725/124, 125; 348/192, 193; 455/115.1, 455/115.2, 115.3, 115.4

(56) References Cited

U.S. PATENT DOCUMENTS 3,619,782 A * 11/1971 Stokes ........................ 725/73
3,978,282 A    8/1976 Fulton, Jr. ................. 178/69 G
4,072,899 A    2/1978 Shimp ......................... 325/67
4,127,817 A * 11/1978 Bell, Jr. ................... 455/67.12
4,127,917 A * 12/1978 Pohio et al. ................. 452/129
4,413,229 A   11/1983 Grant ......................... 324/52
4,439,723 A    3/1984 Loftness ...................... 324/52
4,520,508 A *  5/1985 Reichert, Jr. ................ 725/125
4,609,866 A    9/1986 Loftness ...................... 324/52
4,654,661 A *  3/1987 Carnahan et al. ........ 340/825.57
4,810,961 A    3/1989 Takahashi et al. ............ 324/95
4,814,694 A    3/1989 Takahashi et al. ............ 324/95
4,962,358 A   10/1990 Svetanoff .................... 324/627
5,294,937 A    3/1994 Ostteen et al. .............. 342/459
5,777,662 A *  7/1998 Zimmerman ................ 725/125
5,784,095 A    7/1998 Robbins et al.
5,874,992 A    2/1999 Caporizzo
5,881,363 A    3/1999 Ghosh et al.
6,094,211 A    7/2000 Baran et al.
6,160,990 A   12/2000 Kobayashi et al.
6,166,760 A * 12/2000 Kay .......................... 725/107
6,292,944 B1   9/2001 Harris

* cited by examiner

*Primary Examiner*—John Miller
*Assistant Examiner*—Shirley Chang
(74) *Attorney, Agent, or Firm*—Welsh & Katz, Ltd.

(57) ABSTRACT

The present invention comprises a device which may be attached to a cable ground block (62) such that the level and type for signal emitted through the upstream flow of the signal, from a residence or business (59), may be determined along with the location of the source of ingress of any such signals. The invention, further includes a device (10) to transmit a signal of predetermined frequency towards a residence, such the source of errant signal ingress may be determined. Further, a method of causing the transmission of the signal at a predetermined time, measurement of the signal and determination of the source of the ingress of the signal is provided.

6 Claims, 4 Drawing Sheets

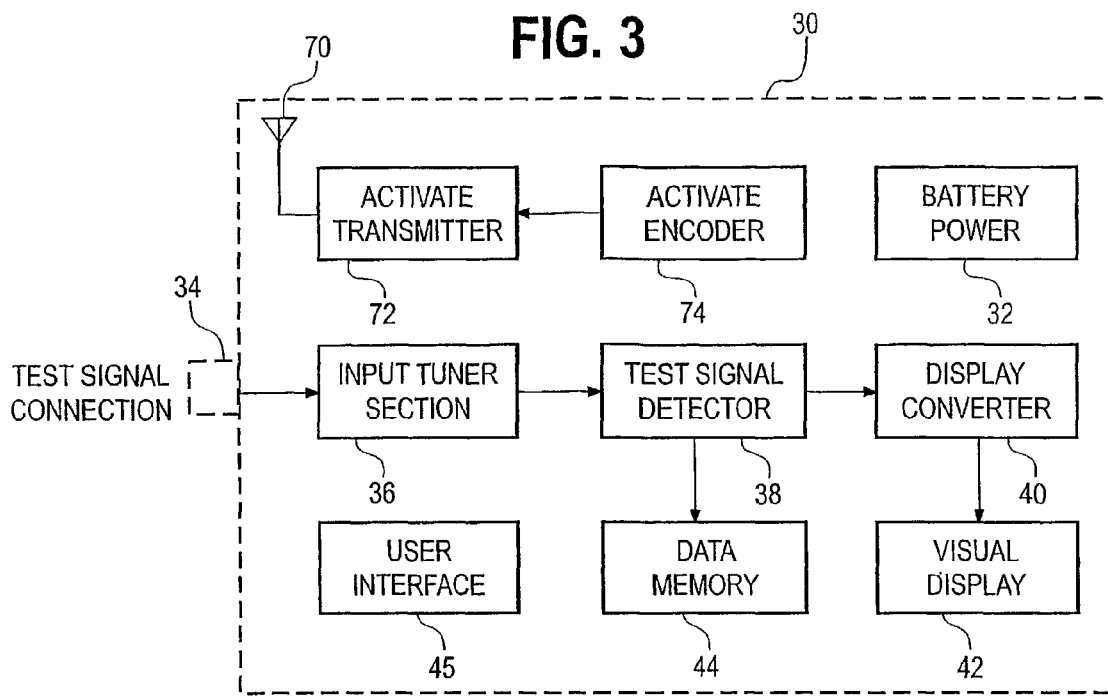
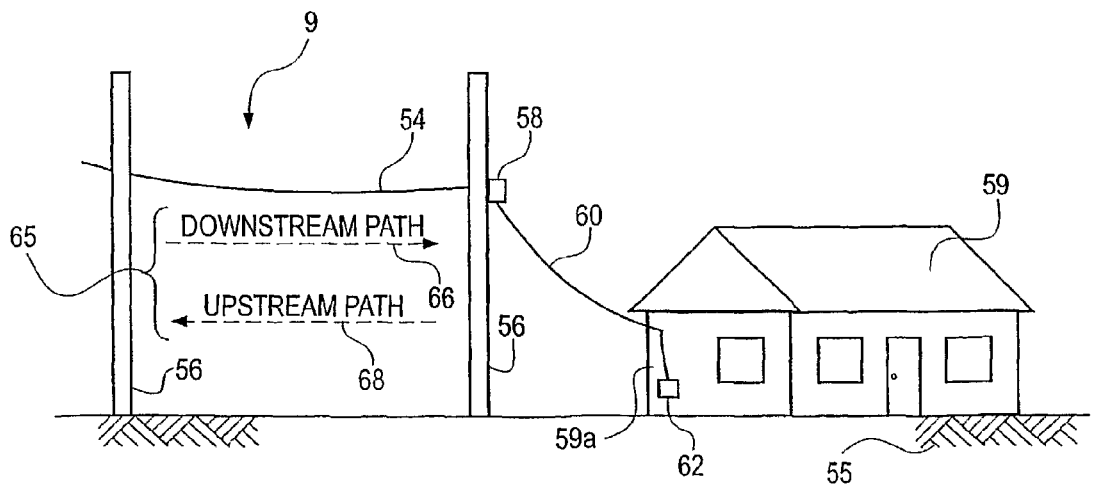

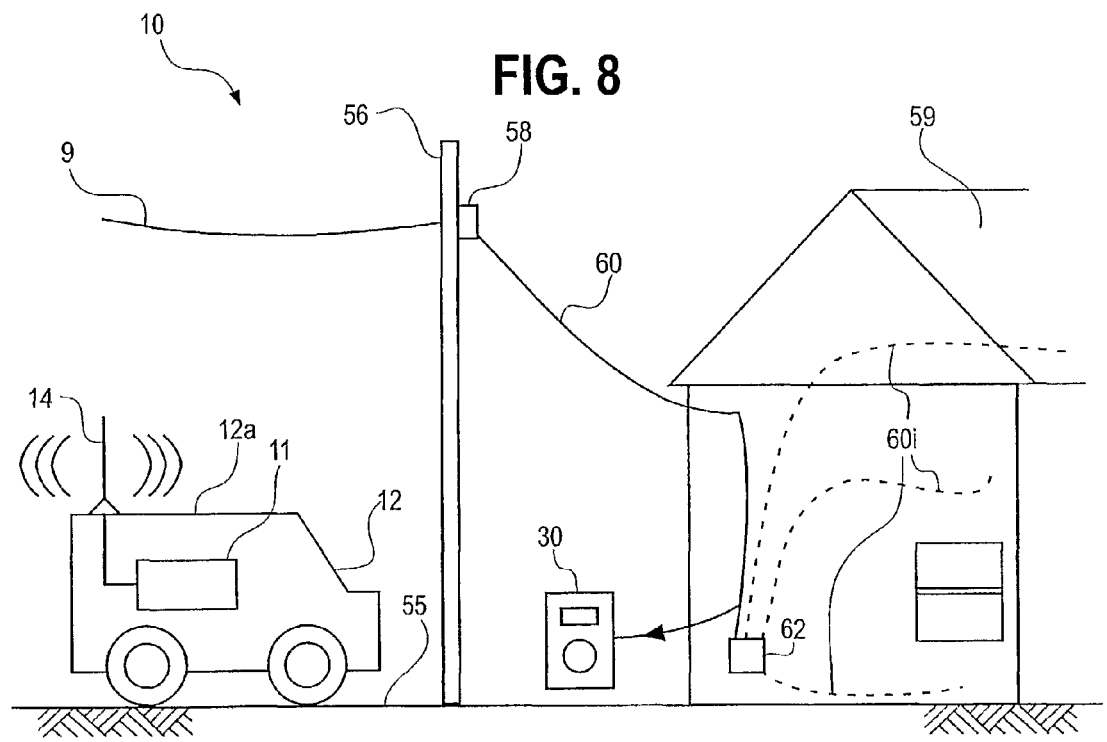
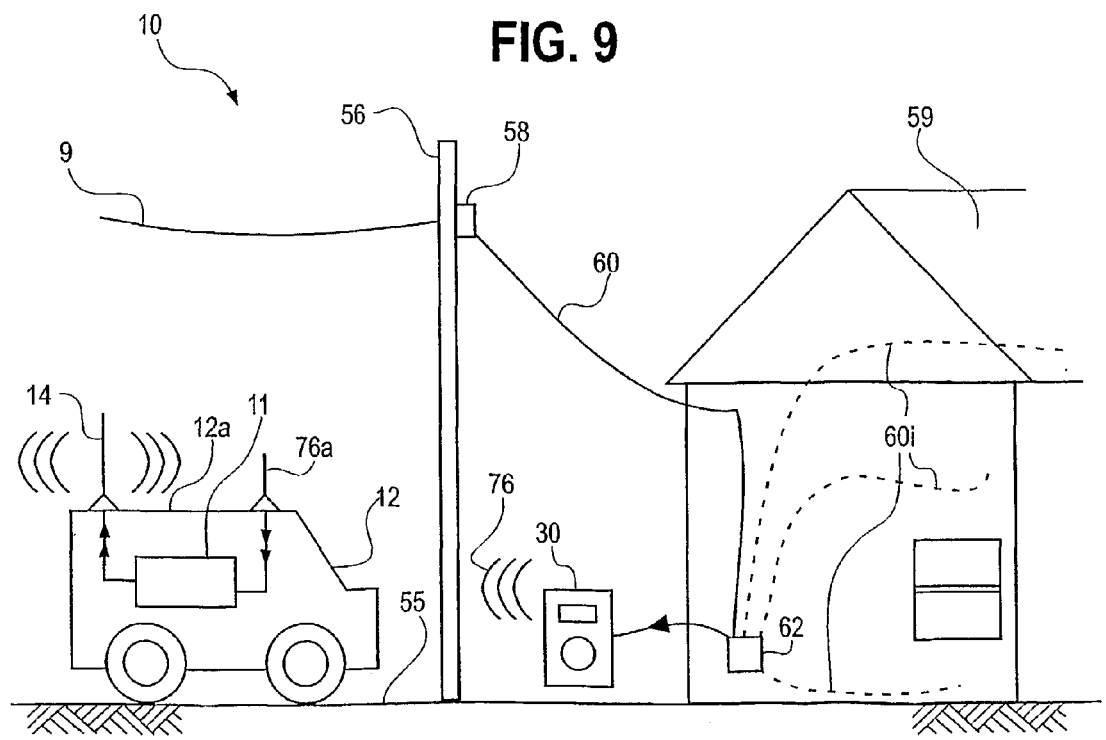

DEVICE AND METHOD OF DETERMINING LOCATION OF SIGNAL INGRESS

This application claims the benefit of the early filing date of provisional application No. 60/204,584, filed May 16, 2000.

FIELD OF THE INVENTION

The present invention concerns a device and method for determining the location and source of errant signals in a cable television system such that signals which cause interference upstream may be identified and eliminated at their source. More particularly, the present invention concerns a device which may be attached at the cable junction of a building, and the method of using the device and an electronic signal radiated at the building, to determine the location of ingress (to the system) of errant signals.

BACKGROUND OF THE INVENTION

Cable television systems, or Community Access Television (CATV) systems, generally comprise a source of cable information (program), a headend, with such systems typically including a satellite receiving device, such as a satellite dish, and a network of cables connected between a cable facility and customers of the cable provider. These systems typically operate in the 50 MHz to 1 GHz spectrum for transmitting signals downstream from the cable source to the end consumer.

The network of cables typically is provided adjacent to other utilities, such as telephone lines and electrical power cables. The network of cables reach homes and businesses from an overhead connection or through underground connections, depending on the means that the electrical and telephone service is provided in the area. In both situations, the cable access to a particular residence or business is provided via a local tap through a cable directed to the destination location, which cable is attached to a ground block and is then routed into the destination location. It is now a practice to also provide high-speed data communications via cable systems. The telecommunications industry has rapidly upgraded coaxial cable systems to facilitate bi-directional communications services. Bi-directional communications services include Plain Old Telephone Service ("POTS"), Internet access, high speed data exchange, interactive video, and other services. Upstream signals from the residence to the cable facility are typically transmitted in the 5 to 50 MHz spectrum. This facilitates two way communications. The upstream path is used with devices such as cable modems and special services devices, such as burglar alarms, fire alarms, and personal health monitors.

While downstream CATV signals are typically of very high quality, upstream signals are more susceptible to noise and interference. Typically, downstream CATV signals are superior to upstream signals because each subscriber receives CATV signals from an individual tap connected directly from the cable system. On the upstream side, however, signal interference accumulates from each subscriber as the signals return towards the cable source.

Because the upstream signals are all typically in the same frequency range, they are particularly susceptible to radio frequency (RF) energy ingress signals from everyday electrical devices. RF signals or ingress enter coaxial cables through weak points or leaks in the system and generally travel upstream. Such signals enter the coaxial network and combine with RF ingress from other points in the network on a power basis as the signals make their way through the network to the headend. The accumulation of errant ingress signals in the 5 to 50 MHz region can render a bi-directional system useless. It is, therefore, necessary to have an ingress integrity system that can detect the RF ingress and the location of RF ingress into the system.

In a typical cable system, the upstream path uses digital signals which are susceptible to unreliable operation if interference signals are present. Examples of devices capable of causing interference are: CB radios, hair dryers, washing machines, food mixers, toasters, vacuum cleaners, and almost any home appliance that has a motor or a power switch. The interference may last for an instant or may be continuous while the device is on, but in either event can catastrophically effect the communication desired.

Ingress problems in the upstream path are typically compounded by the multitude of residences connected to the CATV distribution system. Any one residence is capable of adding an interference signal to the upstream path and degrading and/or inhibiting communications. A multitude of residences, each only adding only a small amount of interference, can also render the upstream path useless because interference signals add on a power basis.

Further, the CATV cabling inside a residence is typically hidden in areas such as crawl spaces, behind walls, attics, and basements. The effects of aging on the cable (especially metal connectors), damage caused by rodents, and possibly improper installation may reduce the shielding integrity of the system within the residence. Poor shielding integrity permits the inside cabling to essentially become a "receiving antenna" for interfering signals. A signal or noise entering (ingress) the internal cabling may travel upstream and cause problems.

Currently, RF detection is accomplished by maintenance personnel in a vehicle driving around the cable plant (network of cables) with transmitters. The transmitters radiate a specific RF signal which can be identified when it leaks into the cable system. This approach is clumsy and unable to provide correlation between the ingress and the location of the mobile transmitter that is providing the test.

U.S. Pat. No. 5,777,662, (the '662 patent), assigned to the owner of the subject invention, Comsonics Corporation of Harrisburg, Va., discloses a system for radiating a signal for capture by cable systems having ingress and egress problems. The system of the '662 patent utilizes a signature RF signal with a GPS (Global Positioning Satellite) signal encoded therein, thus allowing the upstream cable distribution system to determine if an ingress is occurring and, by analysis of the GPS data, the location of the ingress. It is believed that more precise GPS signals would provide more accurate determination of the house or business that is the source of the ingress. However, without a more precise GPS signal, it is still necessary to determine the source of the signal by surveying all of the houses or businesses in the area of the signal. Further, past systems do not allow for the easy determination of the precise location of the ingress source within a house or business.

Because all residences and business locations have the potential to cause problems in the upstream path, a test is needed to qualify each individual residence.

SUMMARY OF THE INVENTION

In accordance with the present invention, a method of determining the location of an ingress of errant signals into a cable system is provided. The method comprises the steps of providing a transmitter and an antenna for radiating an RF signal of a desired frequency, and providing a shielded receiver at the cable entry location of a test site. The receiver includes a tuner, a signal detector, and a display responsive to signals of a particular frequency that pass solely through the cable system of the test site. The method further comprises the step of radiating a signal of the particular frequency and observing a display device, for an indication that errant signals are entering the cable system in a house, business or other cable subscriber location.

In a preferred embodiment, the method is adapted for use in a test site having a plurality of cable connections, such as a plurality of televisions, or cable modem locations in different rooms having a plurality of cables leading from a single hub to each device. The method includes the steps of individually and temporarily disconnecting any one of the plurality of cable connections in the test site and radiating an RF signal of the desired frequency so as to observe the display for reaction showing an ingress of errant signals into the system.

In a preferred embodiment, the method includes the steps of providing an activation encoder and an activation transmitter in the receiver, and further providing an activation receiver and an activation decoder in the transmitter, such that the receiver may signal the transmitter to transmit a signal of a desired frequency, which may be received by the receiver.

Further, in accordance with the present invention, the receiving device for use in measuring the ingress of errant signals of a predetermined frequency range includes an input tuner section for filtering upstream signals and a signal detector in communication with the input tuner. The receiving device further includes an errant signal display in communication with the signal detector, a connector for connecting the receiving device to the cable system cable ground block.

In a preferred embodiment of the receiving device, an antenna, an activate transmitter and an activate encoder are provided, such that the receiving device may specifically activate the transmitter such that ingress of a coded signal is detected.

Further, in accordance with the present invention, a transmitting device for radiating a test location with signals of a predetermined frequency is provided. The transmitting device radiates an errant test signal which is captured by the receiving device. In a preferred embodiment, the transmitting device includes an antenna, a signal filter in electrical communication with the antenna, and a test signal transmitter for radiating a signal of a desired frequency. The transmitting device further includes a transmitter enable switch for permitting the powering-up of the transmitter, an activation receiver for receiving an activation signal from a distant test device (e.g. the receiver) and an activation decoder connected to the activation receiver. The antenna of the transmitting device may receive an activation signal through the filter. In this manner, upon receipt of the activation signal from the test device, the activation decoder causes the transmitter enable switch to permit the powering-up of the test signal transmitter for test signal production. The test signal transmitter creates a signal of the desired frequency, and the signal filter feeds the signal to the antenna for radiation to the coaxial cable system.

A more detailed explanation of the invention is provided in the following description and claims and is illustrated in the accompanying drawings.

BRIEF DESCRIPTION OF THE DRAWINGS

FIG. 3 is a block diagram of a receiver device of the present invention.

FIG. 4 is a pictorial representation of an overhead routing of a CATV distribution system, to a private residence.

FIG. 8 is a pictorial representation of an alternate test setup of the present invention.

FIG. 9 is a pictorial representation of coded test setup of the present invention.

DETAILED DESCRIPTION

Figure 1:
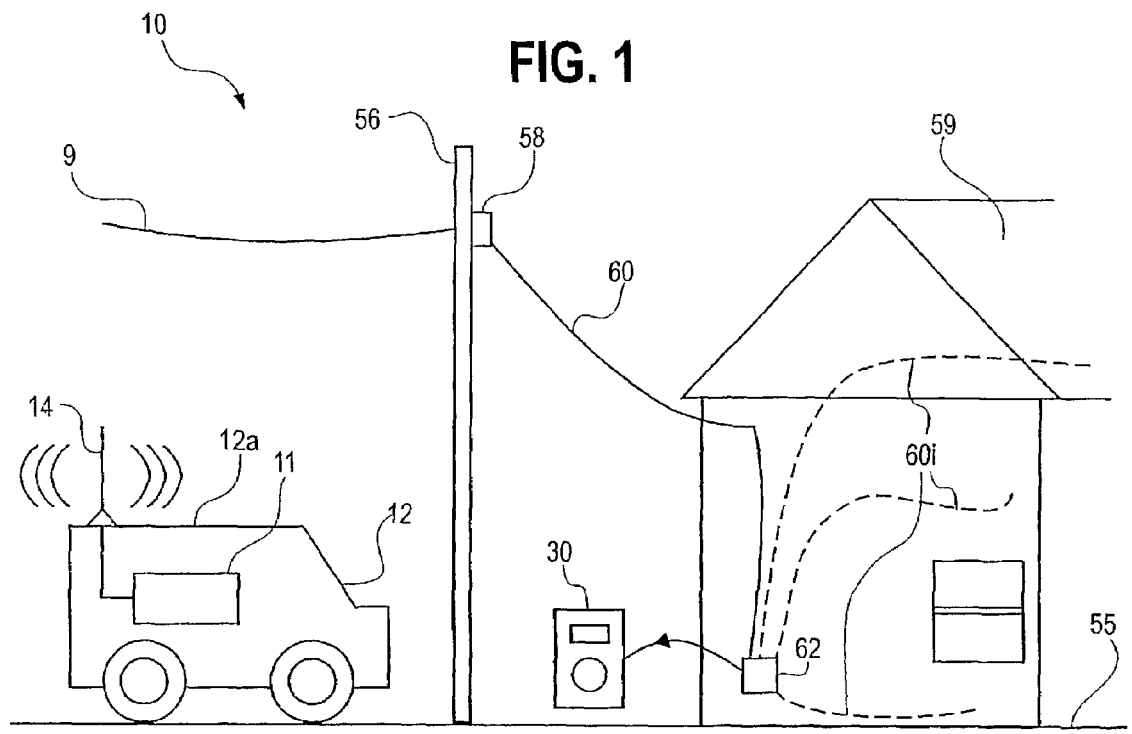
FIG. 1 is a pictorial of a test setup of the present invention.

While the present invention is susceptible of embodiment in various forms, there is shown in the drawings a number of presently preferred embodiments that are discussed in greater detail hereafter. It should be understood that the present disclosure is to be considered as an exemplification of the present invention, and is not intended to limit the invention to the specific embodiments illustrated. It should be further understood that the title of this section of this application ("Detailed Description") relates to a requirement of the United States Patent Office, and should not be found to limit the subject matter disclosed herein.

Figure 5:
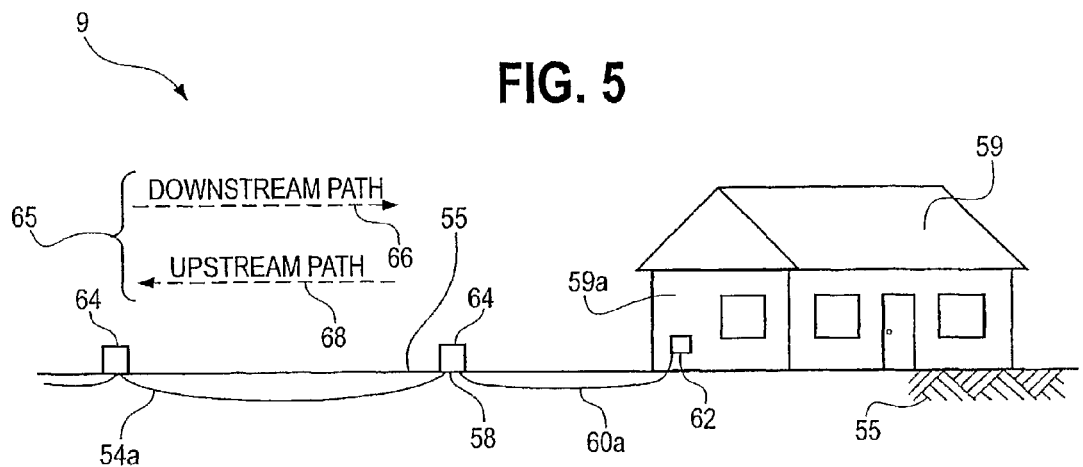
FIG. 5 is a pictorial representation of an underground routing of a CATV distribution system to a private residence.

Referring to FIGS. 1, 4 and 5, a cable system 9 and an ingress detection system 10 are shown. The ingress detection system 10 includes a transmitter 11 for radiating a specific radio frequency (RF) signal. The transmitter 11 is mounted in and powered from a service vehicle 12. A radiating antenna 14 is connected to the transmitter 11 and may be mounted on the vehicle's roof 12a. Preferably, the antenna 14 is placed in a location free of other metallic objects so as to produce a clear unimpeded signal. It is to be understood that any type of suitable antenna that can assist in the transmission of signals, known to those having skill in the art, may be used without departing from the novel scope of the present invention.

A receiver 30, which may be connected to the building's cable outlet includes means for tuning receiver 30 to a specific frequency, and a signal detector for detecting ingress of errant signals into the cable system of the building being tested.

Referring now to FIGS. 4 and 5, the cable system 9 is shown and described. Cable television system 9 distributes signals via cables 54 suspended on utility poles 56 (FIG. 4) or by a cables 54a buried in the ground 55 (FIG. 5). A combination of both methods is common. From the main distribution cable 54 (54a), a local tap 58 is used to interface the distribution system cable 54 (54a) to the residence, business or subscriber 59. Typically, from one to eight, and possibly more, subscribers may be served from a single local tap 58. A multitude of local taps 58 are used through out the typical distribution system to provide cable services to subscribers.

In overhead systems (FIG. 4), a drop cable 60 is suspended from the local tap 58 and secured to the residence 59 at a safe distance from ground 55. The drop cable 60 is typically routed along a side 59a of residence 59 to a ground block 62. The ground block 62 is a "pass-through" device connected to an earth ground. The ground block 62 prevents static build up between cable system 9 and the electrical power wiring of residence 59. This reduces the risk of electrical damage to devices within the residence that are connected to cable system 9.

From the ground block 60 cable signals enter the residence 59 and are routed via an inside cable 60i (FIG. 1) to devices within residence. The cable signals within the residence 59 may be split (branched) into multiple paths to supply cable services to many locations within the residence. Examples of devices connected to the internal cabling 60i are television sets, VCRs, cable modems, digital carrier receivers, and special service transceivers (not shown).

The underground distribution system 9, shown in FIG. 5, has cable 54a buried in the ground 55. The cable 54a only surfaces into above ground enclosures at selected locations throughout cable system 9, called distribution pedestals 64. Opening a pedestal 64 allows access to cable system 9 for maintenance. Distribution pedestals 64 contain local taps 58. An underground cable 60a from the pedestal 64 provides cable services to residence 59, in a similar manner that the drop cable 60 is used in above ground systems. The underground cable 60a typically surfaces just below ground block 62 for connection thereto.

As illustrated in FIGS. 4 and 5, a downstream signals 66 travel from the cable source (not shown) to the subscriber (residence or business) 59, and are typically in the 50 MHz to 1 GHz frequency range. Upstream signals 68 travel from the subscriber (residence or business) 59 to the cable source, and are typically in the 5 to 50 MHz frequency range. In order to enable two way communications on a cable system 9, the upstream signals 68 originate within the residence 59 travel to a central location in the cable system 9. The upstream signals 68 are used for devices such as cable modems (not shown) and special services devices. Special service devices include burglar alarms, fire alarms, and personal health monitors (not shown).

Because upstream signals 68 use the 5 to 50 MHz range, they are vulnerable to interference from the operation of devices that radiate electrical energy in the 5 to 50 MHz frequency range. In a typical cable system 9, the upstream signals 68 are digital signals and, as such, are subject to very unreliable operation if interference signals find their way into system 9. Examples of devices capable of causing interference are: CB radios, hair dryers, washing machines, food mixers, toasters, vacuum cleaners, and almost any appliance having a motor or a power switch. The interference may last for an instant or may be continuous while the device is on, but in either event can catastrophically effect the communication desired.

Ingress problems are typically compounded by the multitude of residences 59 connected to CATV distribution system 9. Any one residence 59 is capable of adding an interference signal on the upstream path thereby disrupting communications. A multitude of residences 59, each only adding only a small amount of interference, can also render upstream path 68 useless. Interference signals add on a power basis.

The CATV cabling inside a residence 59 is usually hidden in areas such as crawl spaces, behind walls, attics, and basements. The effects of aging on the internal cable 60i (especially metal connectors), damage caused by rodents, and possibly improper installation may reduce the shielding integrity of the system within residence 59. Poor shielding integrity permits inside cabling 60i to essentially become a "receiving antenna" for interfering signals. A signal or noise entering (ingress) internal cabling 60i may travel upstream and disrupt communications.

Figure 2:
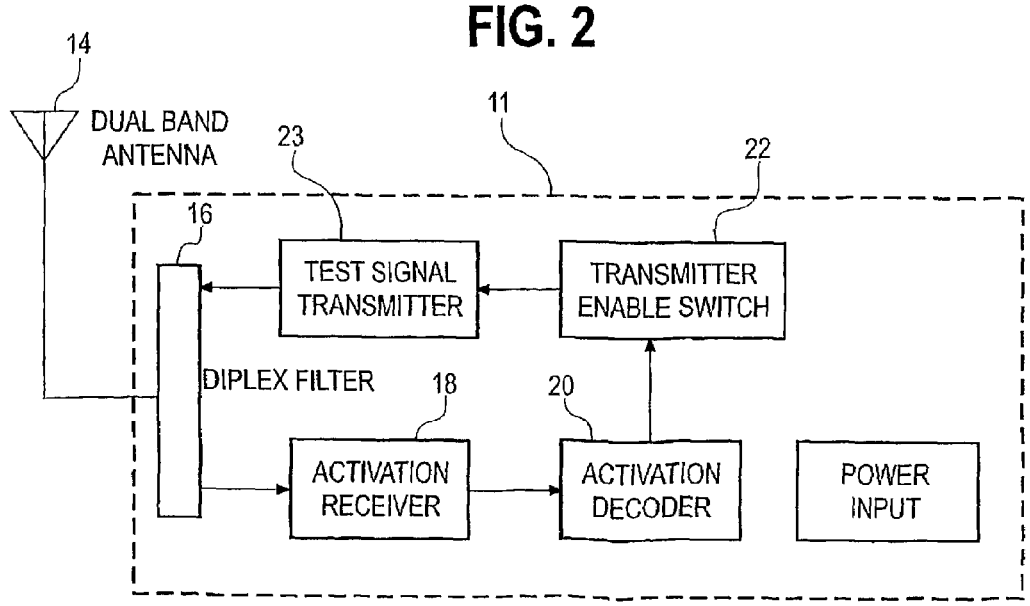
FIG. 2 is a block diagram of a transmitter device of the present invention.

Referring now to FIG. 2, a block diagram of the transmitter 11 is shown. A diplex filter 16 routes an activation signal to an activation receiver 18. An activation decoder 20 determines a code match between the received signal and setting of the transmitter 11. If a code match occurs, the activation decoder 20 activates a transmitter enable switch 22. If a code match does not occur, transmitter 11 remains off. The transmitter enable switch 22 activates the test signal transmitter 23. The test signal transmitter 23 generates a test signal, which is fed to the dual band antenna 14 by the diplex filter 16. The diplex filter 16 prevents the test signal from being improperly routed to the activation receiver 18, and facilitates both transmission and reception of signals.

Referring to FIG. 3, a receiver 30 is powered by a battery 32, and is portable in design. The receiver 30 further includes a test signal connection port 34, which is preferably a coaxial-type connector. It will be understood by persons having skill in the art that any type of connector and any manner of connection may be used without departing from the novel scope of the present invention. In a preferred embodiment, the connection port 34 is connected to an input tuner section 36, which is in turn connected to a signal detector 38. The signal detector 38 is connected to a display converter 40, which provides output to a visual display device 42. In a preferred embodiment, a data memory 44 can also be connected to the test signal detector 38 to save data. Data memory 44 may be, for example, a hard disk, a floppy disk, a zip disk drive, a CD-ROM or other type of device capable of receiving and storing data known to those having skill in the art. The receiver 30 further includes an activation encoder 74, an activation code transmitter 72 as well as an antenna 70 transmitting activation codes, the use of which will be described in greater detail below.

Referring now to FIGS. 1, 2, and 3, in the present invention, the transmitter 11 (FIG. 2) is used to provide a known signal source to allow the integrity of residence 59 to be checked. In the operation of the device, as illustrated in FIG. 1, the transmitter 11 transmits on a frequency in the 5 to 50 MHz range. The transmitter 11 is typically mounted in and powered by the service vehicle 12. In a preferred embodiment, the transmitter 11 also has a feature of variable power output, which will be described in detail below. The antenna 14, which may be omni-directional, is connected to the transmitter 11 and is mounted on the vehicle 12. Preferably, the antenna 14 is mounted on a vehicle roof 12a in an area clear of other metallic objects such as other antennas, ladders, and lifting apparatus. The vehicle 12 is then parked adjacent to the test site dwelling or residence 59 (preferably within 100 feet) and the transmitter 11 is activated. The residence 59 is radiated with the test signal. Preferably, the test signal frequency should be chosen so as not to cause interference with known upstream communications.

Figure 6:
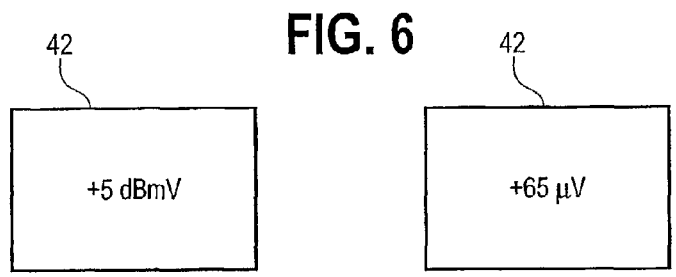
FIG. 6 is a pictorial representation of an embodiment of a display device of the receiver of the device of FIG. 3.
Figure 7:
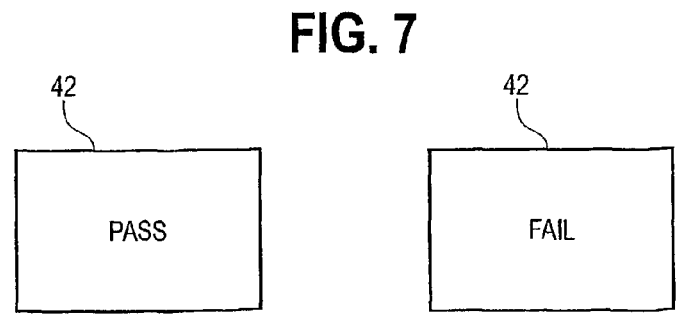
FIG. 7 is a pictorial representation of another embodiment of a display device of the receiver of the device of the FIG. 3.

To qualify the shielding integrity, ie, the ability of the cables 60i (FIGS. 4 and 5) to withstand ingress of errant signals, the drop cable 60 is disconnected from the ground block 62 (FIG. 4). The receiver 30 is then connected to the ground block 62 with a length of high-quality coaxial cable. The receiver 30 is tuned to the frequency of the transmitter 11 and measures the level of test signal being received by internal cabling 60i. It is important to note that the receiver 30 and all connections thereto are completely shielded. This means that none of the radiated signals transmitted by the transmitter 11 can enter the receiver through the receiver box itself or through the test signal connector 34. The only way that the transmitted test signal can be received by the receiver 30 is if the transmitted test signal enters the internal cabling 60i via ingress. In this way the fault path is detected. The level of the received ingress test signal is compared to a reference standard to determine if the shielding integrity of the cabling 60i within the residence 59 is acceptable. Test signal level measurements indicated by the visual display 42 of the receiver 30 (FIG. 3) can be shown in common units of measurement, such as $\mu$V or dBmV (FIG. 6). The receiver 30 may automatically compare the levels of signal ingress to accepted standards and produce a pass/fail message (FIG. 7).

If the measured level of the test signal is greater than acceptable limits, each routing of the internal cables 60i may be tested individually to determine the fault. Usually a CATV signal splitter (not shown) is located in close proximity to the ground block 62 to facilitate disconnecting individual cables 60i from the splitter and retesting.

A further test, illustrated in FIG. 8, involves testing the drop cable 60 section of the residential system. The drop cable 60 is disconnected from the ground block 62 and is connected to the receiver 30. With the transmitter 11 activated and the receiver 30 tuned to the frequency of the transmitter 11, the level of the test signal is measured. The level of the received test signal is compared to a reference standard to determine if the shielding integrity of the drop cable 60 is acceptable. Because the receiver 30 is completely shielded, as described above, any portion of the transmitted test signal that is measured by the receiver 30 must have entered the system via drop cable ingress. A greater than acceptable level measurement would most likely indicate a faulty connection at the local tap 58.

Referring to FIG. 9, a further embodiment, includes the function of the receiver 30 activating the transmitter 11 only when measurements need to be made. In this manner, vehicle power drain, transmitter heating, and general RF pollution is reduced and user or technician working efficiently is increased. Additionally, in this embodiment, an activation signal 76 from the receiver 30 can be encoded to permit the transmitter 11 to recognize the encoded activation signal such that errant signals do not cause a premature radiation of the test signal. The activation signal 76 is transmitted by the activate transmitter 72 and the internal activate antenna 70 of the receiver 30 (FIG. 3), and is received by an activate antenna 76a mounted on the vehicle 12. In this manner, false transmitter activation is eliminated. As will be understood by persons having skill in the art, a multitude of activation codes are available to permit multiple test systems to operate in the same vicinity. In this manner, only the transmitter 11 associated with a given receiver 30 is activated.

Alternatively, as will be understood by persons having skill in the art, a separate transmit antenna 14 and activate antenna 76a need not be used, rather, a single antenna 14 on service vehicle 12 can act as both the transmitter antenna and the activate antenna 76a. Such an antenna 14 can then be used with the diplex filter 16 in the transmitter so as to distinguish and properly utilize the different signals.

A test sequence, of the present embodiment, may, for example, consist of the following steps. The receiver 30 is connected to ground block 62 of a residence 59 under test. A user interface 45 (such as a push button or a switch) activates the activate encoder 74 (FIG. 3), which has been previously configured so as to be matched to the particular transmitter 11. The activate transmitter 72 is powered on and the activate signal 76 (FIG. 9) is radiated by the internal antenna 70 (FIG. 3).

The transmitter 11 (in the vehicle 12) receives the activate signal 76 and verifies the coding. If the coding matches, the vehicle transmitter 11 powers on and radiates the residence 59 with the test signal. The input tuner 36 section of the receiver 30 receives the test signal resulting from ingress into the residence 59. If the test signal detector 38 qualifies the test signal as originating from the test transmitter 11, the display converter 40 (FIG. 3) sends the level measurements to the visual display 42, which may display a pass/fail message (FIG. 7).

What is claimed is:

1. A method of determining the location of an ingress of errant signals into a cable system, comprising the steps of:
   providing a transmitter and an antenna, for radiating an electrical signal of a desired frequency;
   providing a shielded receiver at the cable entry location of a test site, said receiver having a tuner, signal detector and a display reactive to signals of a particular frequency passing solely through the cable system of said test site;
   providing an activation encoder and an activation transmitter in said receiver, and providing an activation receiver and an activation decoder in said transmitter, such that when it is desired to test said cable system, said receiver may signal said transmitter and said transmitter may activate said receiver and then radiate said signal of a desired frequency; and
   radiating a signal of said particular frequency and observing said display for reaction.

2. The method of claim 1, wherein the method is adapted for use in a test site having a plurality of cable connections therein, and including the steps of individually temporarily disconnecting any one of said plurality of cable connections in the test site and radiating another electrical signal of said desired frequency and observing said display for reaction.

3. The method of claim 1, wherein said desired frequency is a frequency of between 5 MHz and 50 MHz.

4. A receiving device for use in measuring the ingress of errant signals of a predetermined frequency range, in a coaxial cable communications system, the receiving device comprising:
   an antenna;
   an input tuner section for filtering of upstream signals;
   a signal detector, in electronic communication with said input tuner;
   an errant signal display in communication with said signal detector;
   an activate transmitter and an activate encoder, such that the receiving device may be specifically activated to test for ingress of a coded signal radiated to the cable communication system; and
   a connector for connecting the receiver to the cable system cable ground block, such that signals traveling in an upstream direction enter said receiver, said input tuner and signal detector, said signal detector causing said signal display to react upon the detection of a signal of a predetermined frequency.

5. A transmitting device for use in measuring the ingress of errant signals of a predetermined frequency range, in a coaxial cable communications system, the transmitting device comprising:
   an antenna;
   a signal filter in electrical communication with said antenna;
   a test signal transmitter for radiating a signal of a desired frequency;

a transmitter enable switch for permitting the powering-up of said transmitter;

an activation receiver for receiving activation instructions from a distant test device;

an activation decoder connected to said activation receiver;

said antenna tuned to receive an activation signal and communicating said activation signal through said filter to said activation receiver for decoding by said activation decoder, such that upon receipt of activation instructions from said test device, said activation decoder causes said transmitter enable switch to permit the powering-up of said test signal transmitter for test signal production, said signal filter feeding a test signal to said antenna for radiation to said coaxial cable system.

6. The transmitting device of claim 5, wherein said desired frequency is a frequency between 5 MHz and 50 MHz.

* * * * *